United States Patent
Merg et al.

(10) Patent No.: US 10,008,050 B2
(45) Date of Patent: Jun. 26, 2018

(54) METHODS AND SYSTEMS FOR PROVIDING A VEHICLE REPAIR TIP

(71) Applicant: Snap-on Incorporated, Kenosha, WI (US)

(72) Inventors: Patrick S. Merg, Hollister, CA (US); Jacob G. Foreman, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days. days.

(21) Appl. No.: 15/499,399

(22) Filed: Apr. 27, 2017

(65) Prior Publication Data

US 2017/0228947 A1 Aug. 10, 2017

Related U.S. Application Data

(63) Continuation of application No. 14/938,662, filed on Nov. 11, 2015, now Pat. No. 9,665,994.

(51) Int. Cl.
G07C 5/08 (2006.01)
G07C 5/00 (2006.01)
G06F 19/00 (2018.01)

(52) U.S. Cl.
CPC ........... *G07C 5/0808* (2013.01); *G07C 5/008* (2013.01); *G07C 2205/02* (2013.01)

(58) Field of Classification Search
CPC .............................. G07C 5/0808; G06F 19/00
USPC ........................................................ 701/29.6
See application file for complete search history.

(56) References Cited

U.S. PATENT DOCUMENTS

| 6,141,608 | A  | 10/2000 | Rother |
| 6,285,932 | B1 | 9/2001  | de Bellefeuille et al. |
| 6,560,516 | B1 | 5/2003  | Baird et al. |
| 6,768,935 | B1 | 7/2004  | Morgan et al. |

(Continued)

FOREIGN PATENT DOCUMENTS

| EP | 2239699 A2     | 10/2010 |
| WO | 02/17118 A2    | 2/2002  |
| WO | 2015/035056 A2 | 3/2015  |

OTHER PUBLICATIONS

International Search Report, Intl. Appl. No. PCT/US2016/061239, dated Jan. 11, 2017 (4 pages).

(Continued)

*Primary Examiner* — Tan Q Nguyen
(74) *Attorney, Agent, or Firm* — McDonnell Boehnen Hulbert & Berghoff LLP

(57) ABSTRACT

A method performed by a first computing system includes receiving, from a second computing system, a message identifying a symptom of a first vehicle; and sending a repair tip to the second computing system. The repair tip includes a first phrase describing a first procedure performed on a second vehicle that exhibited the symptom, wherein the first procedure performed on the second vehicle yielded a result insufficient to determine that a component of the second vehicle associated with the symptom is defective. The repair tip also includes a second phrase describing a second procedure performed on a given vehicle, wherein the given vehicle is either (i) the second vehicle or (ii) a third vehicle that also exhibited the symptom, wherein the second procedure performed on the given vehicle yielded a result sufficient to determine that a component of the given vehicle associated with the symptom is defective.

29 Claims, 9 Drawing Sheets

(56) References Cited

U.S. PATENT DOCUMENTS

| | | |
|---|---|---|
| 6,845,307 B2 | 1/2005 | Rother |
| 7,079,982 B2 | 7/2006 | Ogura et al. |
| 7,142,960 B2 | 11/2006 | Grier et al. |
| 7,209,815 B2 | 4/2007 | Grier et al. |
| 7,209,860 B2 | 4/2007 | Trsar et al. |
| 8,095,264 B2 | 1/2012 | Tanigawa et al. |
| 8,930,064 B2 | 1/2015 | Merg et al. |
| 8,977,423 B2 | 3/2015 | Merg et al. |
| 9,665,994 B1 | 5/2017 | Merg et al. |
| 2002/0007237 A1 | 1/2002 | Phung et al. |
| 2002/0116103 A1 | 8/2002 | Matsunaga et al. |
| 2005/0234602 A1 | 10/2005 | Rigsby |
| 2006/0101074 A1 | 5/2006 | Cancilla et al. |
| 2008/0307010 A1 | 12/2008 | Cullison et al. |
| 2009/0197228 A1 | 8/2009 | Afshar et al. |
| 2010/0010702 A1* | 1/2010 | Gilbert .................... G06N 5/04 701/31.4 |
| 2010/0138701 A1 | 6/2010 | Costantino |
| 2014/0207515 A1 | 7/2014 | Merg et al. |
| 2014/0207771 A1 | 7/2014 | Merg |
| 2015/0046391 A1 | 2/2015 | Merg |
| 2015/0324363 A1 | 11/2015 | Merg |
| 2016/0055686 A1* | 2/2016 | Ukai ....................... G07C 5/008 701/31.5 |

OTHER PUBLICATIONS

Written Opinion of the International Searching Authority, Intl. Appl. No. PCT/US2016/061239, dated Jan. 11, 2017 (7 pages).

* cited by examiner

500

Title
502 — P0335, Replaced Crankshaft Position Sensor

Complaint
504 — The customer states the check engine light is on.

Cause
506 — Connected a scan tool and found P0335 Crankshaft Position Sensor "A" Circuit.

508 — Using the scan tool, monitored the engine speed parameter and found the parameter intermittently dropped out.

512 — Performed a visual inspection of the crankshaft position sensor, found no faults.

514 — Using a lab scope, measured for power and ground at the crankshaft position sensor, and discovered both power and ground were present.

516 — Using the lab scope, monitored the crankshaft position sensor signal and learned that the signal intermittently dropped out.

Correction
518 — Replaced the crankshaft position sensor, cleared codes, and performed a road test of the vehicle. The customer's concern did not return.

FIG. 5

| Repair Record Group | Make | Model | Year | Symptom | Associated Component | # of Repair Records | Tool or Technique Used | Diagnostic Action Performed | Result of Diagnostic Action | Condemning or Non-Condemning |
|---|---|---|---|---|---|---|---|---|---|---|
| 608 | Toyota | Celica GT | 2002 | check engine light on | crankshaft position sensor | 1000 | Scan Tool 609 | Monitored the engine speed parameter 611 | Parameter intermittently dropped out 613 | non-condemning |
| 612 | Toyota | Celica GT | 2003 | check engine light on | crankshaft position sensor | 1500 | Visual Inspection 615 | Visual Inspection of the crankshaft position sensor 617 | No faults 619 | non-condemning |
| 614 | Toyota | Celica GTS | 2002 | check engine light on | crankshaft position sensor | 1250 | Lab Scope 621 | Measured for power and ground at the crankshaft position sensor 623 | both power and ground were present 625 | non-condemning |
| 616 | Toyota | Celica GT | 2003 | check engine light on | crankshaft position sensor | 1500 | Lab Scope 627 | Monitored the crankshaft position sensor signal 629 | Signal intermittently dropped out 631 | condemning |
| 620 | Toyota | Celica GTS | 2004 | check engine light on | crankshaft position sensor | 1300 | Voltmeter | Checked for crankshaft position sensor for continuity | No continuity was found | condemning |

Using the _____, _____ and found the _____ → 708
         709           711                          713

Performed a _____ of the _____, found _____ → 712
            715                  717                719

Using a _____, _____ and discovered _____ → 714
        721            723                         725

Using the _____, _____ and learned that the _____ → 716
          727            729                              731

Utilizing the _____ and found the _____ → 720

Conducted a _____ of the _____, found _____ → 722

- Using the scan tool, monitored the engine speed parameter and found the parameter intermittently dropped out. → 508
- Utilizing the scan tool, checked the engine speed parameter and found the parameter intermittently dropped out. → 528
- Performed a visual inspection of the crankshaft position sensor, found no faults. → 512
- Conducted a visual inspection of the crankshaft position sensor, discovered no faults. → 532
- Using a lab scope, measured for power and ground at the crankshaft position sensor, and discovered both power and ground were present. → 514
- Utilizing the lab scope, checked for power and ground at the crankshaft position sensor and both power and ground were present. → 534

METHODS AND SYSTEMS FOR PROVIDING A VEHICLE REPAIR TIP

REFERENCE TO RELATED APPLICATION

This application is a continuation application of U.S. patent application Ser. No. 14/938,662filed Nov. 11, 2015. U.S. patent application Ser. No. 14/938,662 is incorporated herein by reference (now U.S. Pat. No. 9,665,994).

BACKGROUND

Many products produced by manufacturers occasionally have to be repaired. Many owners are unequipped or otherwise unable to repair certain products. Such owners may depend on professional repair technicians to service or repair the owner's product.

Product manufacturers use a significant amount of resources (e.g., human and financial) to generate repair information, such as repair manuals and technical service bulletins, that repair technicians can reference while diagnosing and repairing a product.

OVERVIEW

Example embodiments are described herein. In a first aspect of this description, one or more example embodiments can be arranged as a computer-readable medium storing instructions that, when executed by a first computing system, cause the first computing system to perform functions. The functions include receiving, from a second computing system, a message identifying a symptom of a first vehicle and sending a repair tip to the second computing system. The repair tip includes a first phrase describing a first procedure performed on a second vehicle that exhibited the symptom. The first procedure performed on the second vehicle yielded a result insufficient to determine that a component of the second vehicle associated with the symptom is defective. The repair tip also includes a second phrase describing a second procedure performed on a given vehicle. The given vehicle is either (i) the second vehicle or (ii) a third vehicle that also exhibited the symptom. The second procedure performed on the given vehicle yielded a result sufficient to determine that a component of the given vehicle associated with the symptom is defective. The component of the given vehicle is equivalent to the component of the second vehicle.

In a second aspect of this description, one or more example embodiments can be arranged as a method performed by a first computing system. The method includes receiving, from a second computing system, a message identifying a symptom of a first vehicle and sending a repair tip to the second computing system. The repair tip includes a first phrase describing a first procedure performed on a second vehicle that exhibited the symptom. The first procedure performed on the second vehicle yielded a result insufficient to determine that a component of the second vehicle associated with the symptom is defective. The repair tip also includes a second phrase describing a second procedure performed on a given vehicle. The given vehicle is either (i) the second vehicle or (ii) a third vehicle that also exhibited the symptom. The second procedure performed on the given vehicle yielded a result sufficient to determine that a component of the given vehicle associated with the symptom is defective. The component of the given vehicle is equivalent to the component of the second vehicle.

In a third aspect of this description, one or more example embodiments can be arranged as a first computing system. The first computing system includes one or more processors and a non-transitory computer-readable medium storing instructions, that when executed by the one or more processors, cause the first computing system to perform functions. The functions include receiving, from a second computing system, a message identifying a symptom of a first vehicle and sending a repair tip to the second computing system. The repair tip includes a first phrase describing a first procedure performed on a second vehicle that exhibited the symptom. The first procedure performed on the second vehicle yielded a result insufficient to determine that a component of the second vehicle associated with the symptom is defective. The repair tip also includes a second phrase describing a second procedure performed on a given vehicle. The given vehicle is either (i) the second vehicle or (ii) a third vehicle that also exhibited the symptom. The second procedure performed on the given vehicle yielded a result sufficient to determine that a component of the given vehicle associated with the symptom is defective. The component of the given vehicle is equivalent to the component of the second vehicle.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 5 shows an example repair tip.

FIG. 6 shows an example data table stored by a computing system.

FIG. 7 shows example phrase templates.

FIG. 8 shows example phrases.

DETAILED DESCRIPTION

I. Introduction

Figure 1:
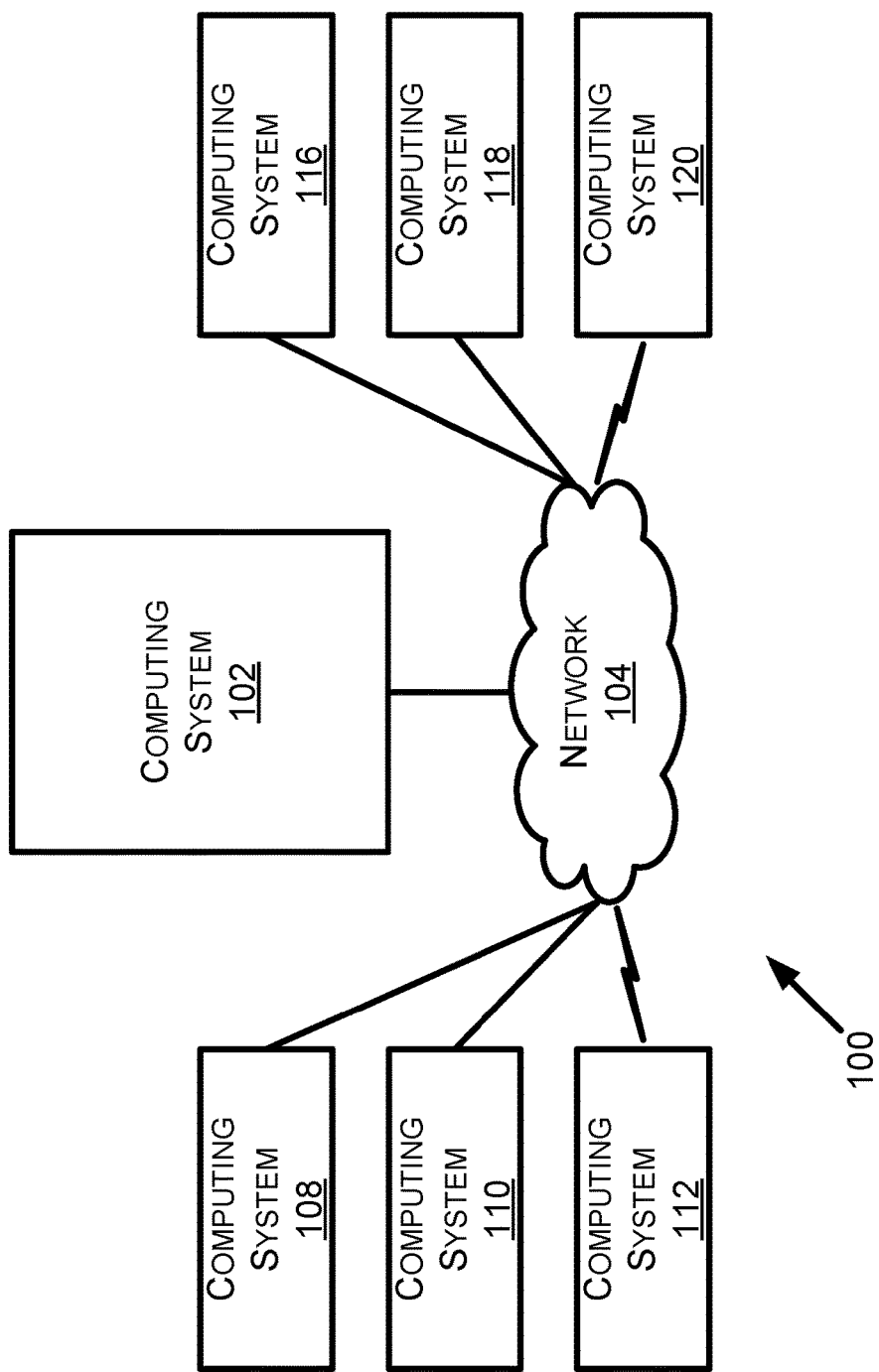
FIG. 1 is a block diagram of networked computing systems.

Traditionally, when diagnosing a symptom of a vehicle and repairing the vehicle to address the symptom, a repair technician might consult a repair manual that is in paper form or in an electronic format stored on a computing device. In either case, the paper or electronic repair manual may become dated as time passes and the repair technician may be unaware of new techniques for repairing the vehicle that other repair technicians have discovered. Therefore, it may be useful for up-to-date repair data submitted by many such repair technicians to be available on a database that is shared among repair technicians. The database may be accessible via electronic vehicle repair tools and/or other computing devices. It may also be useful to provide repair tips in the form of randomly varying phrase formats to better catch the attention of a repair technician that is viewing the repair tip.

For purposes of this description, a vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Although many of the example embodiments are described with respect to a vehicle, the example embodiments can be applicable to products or repairable items other than a vehicle. As an example, the other products or repairable items can include home appliances, such as a generator, a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements of a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a computing system 102 (e.g., a vehicle repair data (VRD) system) and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes computing systems 108, 110, 112, 116, 118, and 120. The computing systems 108-120 may take the form of a vehicle repair tool (VRT). Any of the computing systems 108-120 described herein can be, but is not required to be, configured to generate or transmit an original repair order (RO) to computing system 102. The operator of computing system 102 can enter an original RO into computing system 102 using an RO manual entry device, such as an RO manual entry device 202 shown in FIG. 2. The manually-entered RO can be stored in a data storage device, such as a data storage device 210 shown in FIG. 2.

Computing systems 108-120 may represent vehicle repair tools that are configured to perform various functions. For example, any of the computing systems 108-120 may send a request, to computing system 102, for a repair tip that is stored at and/or generated by computing system 102. The request may be sent using network 104. Any of the computing systems 108-120 may also receive a repair tip transmitted from computing system 102 using network 104 or otherwise provided or generated by computing system 102. Any of the computing systems 108-120 may also present a received repair tip via a user interface.

Figure 2:
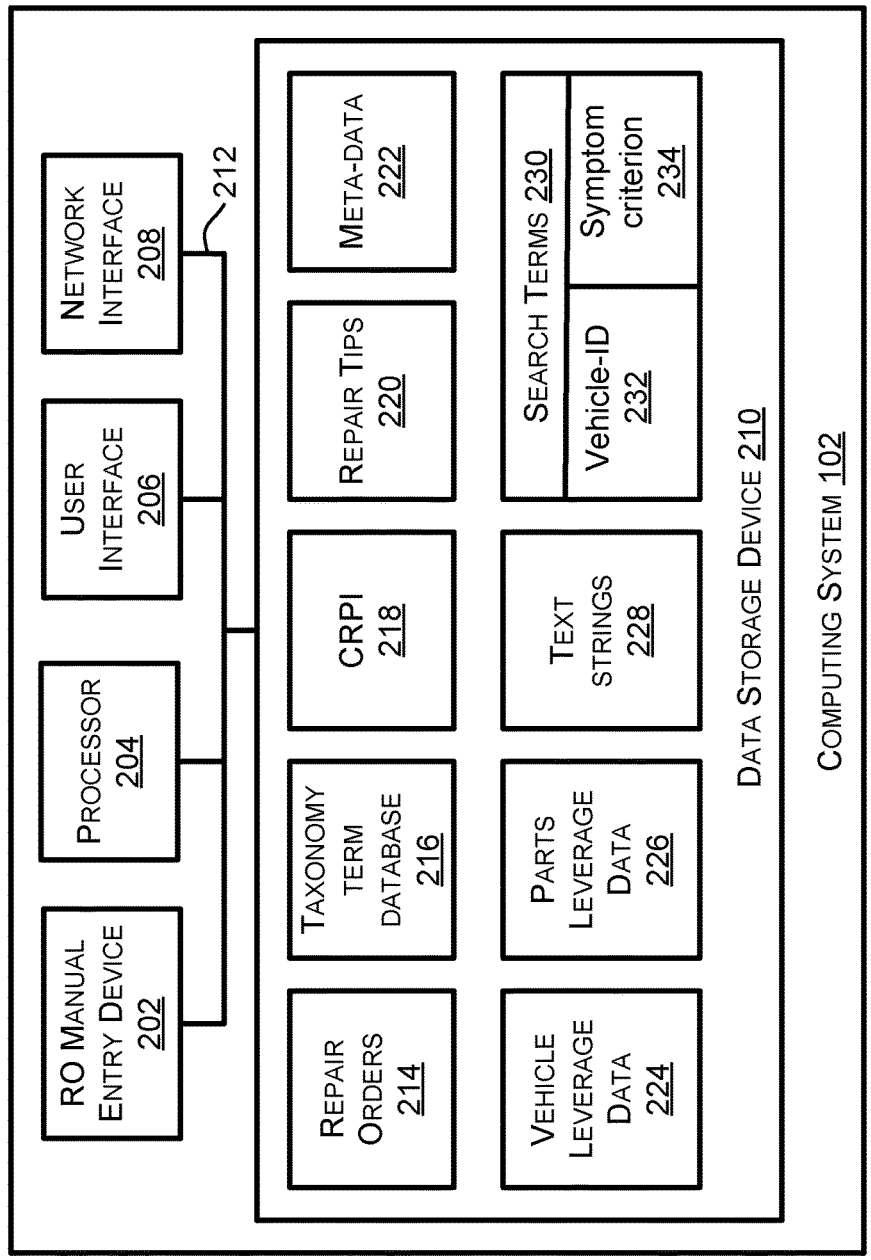
FIG. 2 is a block diagram of a computing system.

Next, FIG. 2 is a block diagram showing details of a computing system 102 (e.g., a vehicle repair data (VRD) system). Computing system 102 can comprise, be configured as, or be referred to as a server system, a server device, or more simply, a server. In accordance with embodiments in which computing system 102 operates as a server, computing system 102 can serve one or more computing systems 108-120 (e.g., vehicle repair tools (VRT)) operating as a client device to the server.

Computing system 102 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into computing system 102 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, Computing system 102 can be configured such that an original RO generated by a first computing system, such as computing system 108, is not provided to a second computing system, such as computing system 116. In other examples, computing system 102 can generate a presentable RO based, at least in part, on information on the original RO generated by the computing system 108, and provide the presentable RO to computing system 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times.

User interface 206 can include an interface to components operable to receive input, data, or information into computing system 102 or to components that can present data or information output for computing system 102. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into computing system 102 or to present data or information output by user interface 206.

User interface 206 can include a transmitter or transceiver to provide the data or information to another user interface component or to another element of computing system 102. The data or information provided by user interface 206 can include, but is not limited to include, a repair tip of repair tips 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as data storage device 210, can include a non-transitory computer-readable storage medium readable by processor 204. In an alternative arrangement, data storage device 210 can include two or more non-transitory computer-readable storage mediums. Each non-transitory computer-readable storage medium can include volatile or non-volatile storage components, such as optical, magnetic, organic or other memory or disc storage, which can be integrated in whole or in part with a processor, such as processor 204.

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair tips 220, meta-data 222, vehicle leverage data 224, parts leverage data 226, text strings 228, and search terms 230. Search terms 230 can include, but is not limited to, vehicle-identification (i.e., vehicle-ID) search terms 232, such as year/make/model/engine (Y/M/M/E) attributes, and symptom criterion 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a computing system 108-120 shown in FIG. 1 or entered using RO manual entry device 202, or a presentable RO generated by computing system 102.

Mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

Processor 204 can search the text, symbols or other content on an RO of RO 214 or the meta-data associated with an RO to associate an RO within a cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214. Table 1 shows examples of DTC, Action, and component attributes associated with each respective RO cluster.

TABLE 1

| Cluster ID | Cluster Size | DTC | Action | Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Repair tips for those example customer complaint terms can include repair tips identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or computing system 102. The RO data in Table 2 also includes year/make/model/engine attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |

TABLE 2-continued

| RO ID | Year | Make | Model | Engine |
|---|---|---|---|---|
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | LS2 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E150 | 4.6 L, V8, VIN (6) |
| 1194 | 2002 | Ford | Pickup F150 | 4.2 L V6, VIN (2) |
| 8797 | 2006 | Ford | Crown Victoria LX | 4.6 L V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair tips based on a sub-model in addition to Y/M/M/E attributes can lead to search results having RO or repair tips associated with a particular sub-model, but not the other sub-model(s) of a particular vehicle having particular Y/M/M/E attributes. The "S" within Y/M/M/S/E can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of attributes including a system attribute can be referred to as Y/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle part and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 90 RO or a single RO cluster for the 90 RO. A greater quantity of RO can indicate a greater likelihood of occurrence of a successful repair of a given problem arising from the coolant temperature sensor.

CRPI 218 can include program instructions executable by processor 204 to carry out functions described herein or performable by computing system 102. CRPI 218 can include program instructions that are executable to parse data from an original RO stored within RO 214 and to identify the service procedure information, vehicle identification, and parts usage information from the original RO for use in generating a presentable RO or to increment a count of a cluster size if a presentable RO pertaining to the original RO has already been generated.

CRPI 218 can include program instructions executable by processor 204 to generate, for each repair tip and based on the RO stored in RO 214, meta-data associated with at least one set of search terms. Meta-data 222 can include meta-data generated by processor 204 based the information listed on original RO including, but not limited to the LOC and a definition of the LOC.

CRPI 218 can include program instructions executable by processor 204 to determine that words or phrases within service procedure information, such as service procedure information are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

Text strings 228 (e.g., a phrase template or a phrase) can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair tip of repair tips 220. Processor 204 can select the meta-data to insert into the gap(s) of a text string. Text strings 228 can include text strings representing input received by user interface 206. Text strings 228 can include text strings received by network interface 208.

Search terms 230 can include various sets of search terms. A set of search terms can include vehicle-ID search terms 232 or a symptom criterion 234. A first example set of search terms can include search terms received by network interface 208 as part of a request for a repair tip. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair tip. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E attributes, defined in taxonomy term database 216 and standard symptom criterion defined in taxonomy term database 216. Processor 204 can associate one or more standard sets of search terms with a repair tip or a repair order. A set of search terms associated with a repair tip or repair order can be stored as meta-data associated with that repair tip or repair order. Taxonomy term database 216 can include search terms 230. The second example set of search terms can be associated with one more sets of search terms like the first example set of search terms.

Table 5 shows an example of search terms that can be stored in search terms 230. NSST-227 is associated with SST-15. SST-15 is associated with RO ID 3915. A repair tip corresponding to RO ID 3915 can be identified in response to receiving NSST-227, determining that SST-15 is associated with NSST-227, and determining RO ID 3915 is associated with SST-15. SST-1456 is a set of standard search terms having symptom criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Y/M/M/E | Symptom Criterion | Associations |
| --- | --- | --- | --- |
| NSST-227 | 97 Ford Crown Vic. 8 cyl. | Emissions and MAF failed. DTC P171 P174. | SST-15 |
| SST-15 | 1999/Ford/Crown Victoria/4.6 L V8 (W) | Pcode: P0171, P0174 Component: MAF sensor Work Requested: failed state emissions certification | RO ID 3915 NSST-227 |
| SST-1456 | 2000/Ford/Crown Victoria/4.6 L V8 (W) | Pcode: P0171, P0174 Component: MAF sensor Work Requested: failed state emissions certification | RO ID 3915 |

The vehicle-ID search terms 232 is one example of search terms that can be included within search terms 230. Vehicle-ID search terms 232 can include various selectable attributes. For example, the attributes of vehicle-ID search terms 232 can include Y attributes. As another example, the attributes of vehicle-ID search terms 232 can include Year/Make/Model/Sub-model/Engine (Y/M/M/S/E) attributes as discussed with respect to Table 2. As another example, the attributes of vehicle-ID search terms 232 can include Year/Make/Model/Engine/System (Y/M/M/E/Sys) attributes. As another example, the attributes of vehicle-ID search terms 232 can include Year/Make/Model/Sub-model/Engine/System (Y/M/M/S/E/Sys) attributes.

The system (Sys) attribute vehicle-ID search terms 232 can indicate or represent a system (e.g., one or more systems) or a component (e.g., one or more components) within a vehicle. As an example, the system or component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other system or component installed within, attached to, or other otherwise operating on or in the vehicle.

The order of any of the vehicle-ID search terms 232 described herein can be rearranged as desired. For example, the order of the Y/M/M/E attributes could be rearranged as Make/Model/Engine/Year (M/M/E/Y) attributes or in another arrangement.

Figure 3:
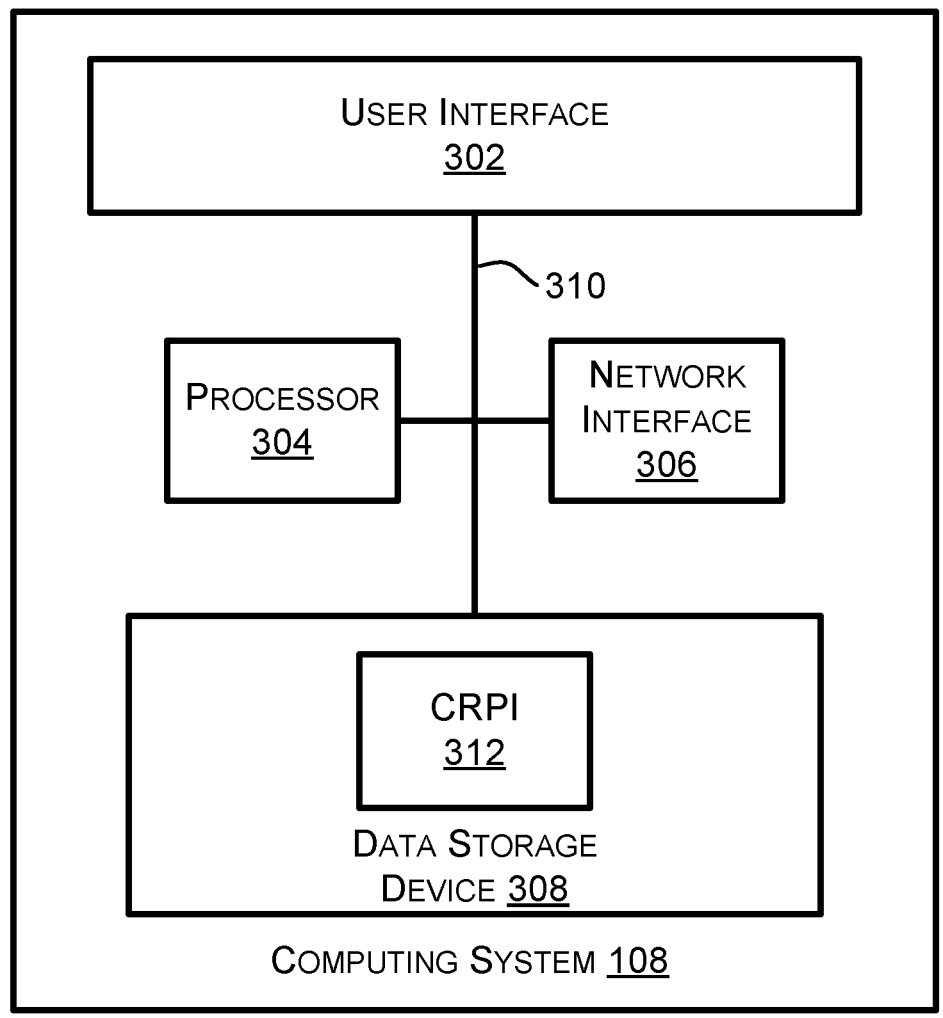
FIG. 3 is a block diagram of a computing system.

Next, FIG. 3 is a block diagram showing details of an example computing system 108 (e.g., a vehicle repair tool (VRT)). Computing system 108 includes a user interface 302, a processor 304, a network interface 306, and a data storage device 308, all of which can be linked together via a system bus, network, or other connection mechanism 310. One or more of the computing systems 108-120 shown in FIG. 1 can be arranged like computing system 108 and vice versa.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The (or each) non-transitory computer-readable storage medium can include volatile or non-volatile storage components, such as optical, magnetic, organic or other memory or disc storage, which can be integrated in whole or in part with a processor 304.

User interface 302 can include an interface to components that are configured to receive input for the computing system 108 or to components that are configured to present data or information output for computing system 108. Any of those components can be referred to as a VRT user interface component. User interface 302 can include one or more audio/visual ports or communication ports that connect to a VRT user interface component by a wired or wireless user interface communication link. Data, input, or information received by computing system 108 via user interface 302 can include data or information for preparing an RO.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into computing system 108 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, based on input received by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC). CRPI 312 can include program instructions for (i) displaying, by user interface 302, vehicle-ID attributes selectable to form a set of search terms, symptom criterion selectable to form part of the set of search terms, and a field for entering a usage indicator (e.g., a vehicle mileage or hours of engine use), (ii) receiving a selection of the set of search terms, (iii) providing the selected set of search terms to network interface 306 for transmission of the selected search terms to computing system 102, (iv) receiving, by network interface 306, a repair tip from computing system 102, and (v) displaying the received repair tip using user interface 302.

III. Example Operation

Figure 4:
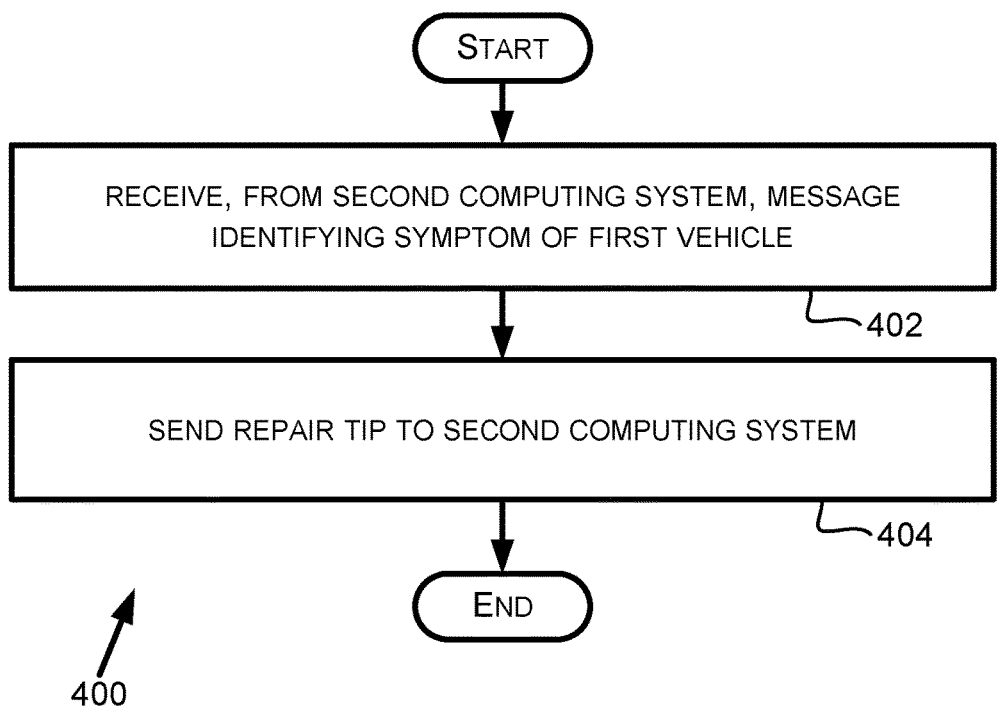
FIG. 4 is a flowchart depicting an example method.

FIG. 4 is a flowchart depicting a method 400 that can be carried out in accordance with one or more example embodiments described herein. The method 400 includes the functions shown in blocks 402 and 404. A variety of methods can be performed using one or more of the functions shown in the method 400 and one or more other functions described herein. Reference numbers included within the description of FIG. 4 are provided as examples, rather than to limit the description to only the particular configuration(s) including the components associated with the reference numbers.

The method 400 may be performed by a first computing system, such as the computing system 102. Block 402 includes receiving, from a second computing system, a message identifying a symptom of a first vehicle. For example, the computing system 102 may receive, from the computing system 108, a message indicating that a first vehicle's check engine light is on. The message may be received via the network 104. Other symptoms are possible, such as the first vehicle's engine won't start, the first vehicle's brake lights are out, etc. The message may indicate a make, model, sub-model, trim package, and/or year of manufacture of the first vehicle. For example, the message may indicate that the first vehicle is a 2002 Toyota Celica GT. The first vehicle may belong to a customer of a repair shop to which the customer has brought the first vehicle for repair. The computing system 108 may receive input entered by a repair technician that is working on the first vehicle. The received input may represent information about the first vehicle that is included in the message sent by the computing system 108 to the computing system 102.

Block 404 includes sending a repair tip to the second computing system. For example, the computing system 102 may send the repair tip 500 of FIG. 5 in the form of data to the computing system 108 (i.e., a computing system from which the computing system 102 received the message that included information about the first vehicle and the symptom of the first vehicle). The repair tip 500 may be sent via the network 104. The computing system 108 may then display the repair tip as shown in FIG. 5 for viewing by a repair technician or another user.

The repair tip 500 may include a title phrase 502, a complaint phrase 504, cause phrases 506, 508, 512, 514, and 516, and a correction phrase 518. The phrases 502-518 may be selected or generated by the computing system 102 based on information included in the message received by the computing system 102 from the computing system 108.

The title phrase 502 may include a brief summary of one or more diagnostic or corrective procedures performed with regard to a component of an additional vehicle. (In the context of describing the repair tip 500 herein, the "additional vehicle" may, in some cases, be at least two additional vehicles. That is, the repair tip 500 may include information related to multiple vehicles that are similar to the first vehicle and have had similar diagnostic or corrective procedures performed on them with similar results.) The title phrase 502 includes "P0335, Replaced Crankshaft Position Sensor."

The complaint phrase 504 may describe a symptom of the additional vehicle that indicated a potential problem or malfunction related to the component of the additional vehicle. The complaint phrase 504 includes "The customer states the check engine light is on."

The cause phrases 506-516 may describe respective diagnostic procedures that were performed on the component of the additional vehicle. The repair tip 500 will generally include at least one "non-condemning" cause phrase, that is, a phrase that describes a procedure performed on the additional vehicle that yielded a result insufficient to determine that the component of the additional vehicle associated with the symptom is defective. In some examples, performing the procedure suggested by the non-condemning phrase may help the repair technician working on the first vehicle discover an "easy fix" for the symptom such as reconnecting a wire or cleaning a corroded contact etc. The repair tip 500 will also generally include at least one "condemning" cause phrase, that is, a phrase that describes a procedure performed on the additional vehicle that yielded a result sufficient to determine that a component of the additional vehicle associated with the symptom is defective. In some examples, the procedure suggested by the condemning phrase may be more time-consuming, expensive, or burdensome than procedures suggested by non-condemning phrases, but at times it may be necessary to perform such procedures so that a component can be properly diagnosed or troubleshooted. The phrases 506, 508, 512, and 514 are examples of non-condemning phrases, whereas the phrase 516 is an example of a condemning phrase.

The (non-condemning) phrase 506 includes "Connected a scan tool and found P0335 Crankshaft Position Sensor 'A' Circuit." The (non-condemning) phrase 508 includes "Using the scan tool, monitored the engine speed parameter and found the parameter intermittently dropped out." The (non-condemning) phrase 512 includes "Performed a visual inspection of the crankshaft position sensor, found no faults." The (non-condemning) phrase 514 includes "Using a lab scope, measured for power and ground at the crankshaft position sensor, and discovered both power and ground were present." The (condemning) phrase 516 includes "Using the lab scope, monitored the crankshaft position sensor signal and learned that the signal intermittently dropped out."

In other examples, the repair tip 500 may include more or fewer phrases. The cause phrases 506-516 describe respective procedures performed on the additional vehicle that exhibited the same symptom as the first vehicle (e.g., the check engine light was on). The computing system 102 may store data (e.g., in a repair order or a repair record) related to the respective procedures that were performed. In one example, such data may be sent to the computing system 102 from a third computing system 110 (e.g., data submitted by a different repair technician). Herein, it should be understood that any of the phrases 506-516 may, in some examples, describe respective procedures performed on separate vehicles, or on the same vehicle.

The (non-condemning) phrase 506 describes a first procedure performed on the additional vehicle. In this context, the first procedure performed on the additional vehicle yielded a result insufficient to determine that a component of the additional vehicle associated with the symptom is defective. As shown by the phrase 506, the first procedure may include connecting a scan tool to the crankshaft position sensor circuit and having the scan tool return a diagnostic trouble code P0335. The additional vehicle may be associated with the first vehicle in various ways as described below. Thus, the information regarding the additional vehicle may be useful for repairing the first vehicle.

The (non-condemning) phrase 508 describes a second procedure performed on the additional vehicle. In this context, the second procedure performed on the additional vehicle yielded a result insufficient to determine that a component of the additional vehicle associated with the symptom is defective. As shown by the phrase 508, the second procedure may include using a scan tool to monitor an engine speed parameter of the additional vehicle and finding that the engine speed parameter intermittently dropped out. Using a scan tool to find that that the engine speed parameter intermittently dropped out may be insufficient to determine that the crankshaft position sensor of the additional vehicle is defective.

The (non-condemning) phrase 512 describes a third procedure performed on the additional vehicle. In this context, the third procedure performed on the additional vehicle yielded a result insufficient to determine that a component of the additional vehicle associated with the symptom is defective. As shown by the phrase 512, the third procedure may include performing a visual inspection of the crankshaft position sensor and finding no faults. Performing a visual inspection of the crankshaft position sensor and finding no faults may be insufficient to determine whether the crankshaft position sensor of the additional vehicle is defective.

The (non-condemning) phrase 514 describes a fourth procedure performed on the additional vehicle. In this context, the fourth procedure performed on the additional vehicle yielded a result insufficient to determine that a component of the additional vehicle associated with the symptom is defective. As shown by the phrase 514, the fourth procedure may include using a lab scope to measure for power and ground at the crankshaft position sensor, and discovering that both the power and ground were present. Using a lab scope to measure for power and ground at the crankshaft position sensor and finding that both the power and ground were present may be insufficient to determine that the crankshaft position sensor of the additional vehicle is defective.

The (condemning) phrase 516 describes a fifth procedure performed on the additional vehicle. In contrast to the first, second, third, and fourth procedures described by the respective phrases 506, 508, 512, and 514, the fifth procedure performed on the additional vehicle yielded a result sufficient to determine that a component of the additional vehicle associated with the symptom is defective. As shown by the phrase 516, the fifth procedure may include using a lab scope to monitor the crankshaft position sensor signal, and learning that the crankshaft position sensor signal intermittently dropped out. Using a lab scope to monitor the crankshaft position sensor signal and finding that the crankshaft position sensor signal intermittently dropped out may be sufficient to determine that the crankshaft position sensor of the additional vehicle is defective.

The correction phrase 518 describes a corrective procedure that was performed with regard to the component of the additional vehicle. For example, the phrase 518 includes "Replaced the crankshaft position sensor, cleared codes, and performed a road test of the vehicle. The customer's concern did not return."

The repair tip 500 is shown as including eight phrases, but in other examples, repair tips may include any number of phrases. Such repair tips will generally include at least one non-condemning phrase and at least one condemning phrase.

The method 400 may further involve generating the repair tip 500 by generating one or more of the phrases 502-518. In this context, sending the repair tip to the second computing system may include sending the generated phrases 502-518 to the second computing system.

For example, the computing system 102 may use various data stored at data storage device 210 and the contents of the message received from the computing system 108 to generate the repair tip 500. For instance, the message received by the computing system 102 from the computing system 108 may indicate that the first vehicle is a 2002 Toyota Celica GT and that the first vehicle's check engine light is on. In response, the computing system 102 may search data storage device 210 for data corresponding to other vehicles that are associated with the first vehicle and that had exhibited a check engine light that was on. For instance, the computing system 102 may search for records corresponding to 2000-2005 models of either Toyota Celica GT or GTS trim packages that exhibited check engine lights that were on. The computing system 102 may search for data that is related to the first vehicle in other ways as well. For example, the computing system 102 may search for data related to vehicles that differ in make, model, and/or year, but are known to share common components. The computing system 102 may use such data to generate the repair tip, including the phrases 502-518, to be sent to the computing system 108.

For example, the computing system 102 may identify data that is stored at data storage device 210. Based on the contents of the message received by the computing system 102 from the computing system 108, the computing system 102 may identify at least repair record groups 608, 612, 614, 616, and 620 of data table 600 of FIG. 6 as containing relevant data. That is, repair record groups 608-620 may each correspond to a vehicle that was manufactured between 2000-2005, is either a Toyota Celica GT or a Toyota Celica GTS, and exhibited a check engine light that was on.

By further example, the computing system 102 may store a plurality of phrase templates 708, 712, 714, 716, 720, and 722 of FIG. 7 at data storage device 210. The computing system 102 may (e.g., randomly) select the phrase template 708 for insertion of the data 609, 611, and 613. The computing system 102 may (e.g., randomly) select the phrase template 712 for insertion of the data 615, 617, and 619. The computing system 102 may (e.g., randomly) select the phrase template 714 for insertion of the data 621, 623, and 625. The computing system 102 may (e.g., randomly) select the phrase template 716 for insertion of the data 627, 629, and 631. In other examples, any of the phrase templates 708-722 could be assigned to different identified data, or phrase templates not shown in FIG. 7 may be assigned to various other data.

The phrase templates 708-722 may be cause phrase templates. Cause phrase templates may be used to generate cause phrases, that is, phrases that describe diagnostic procedures performed on a component of a vehicle. Data from the fields "Associated Component," "Tool or Technique Used," "Diagnostic Action Performed," and/or "Result of Diagnostic Action" of data table 600 may be inserted into cause phrase templates to generate either a condemning or non-condemning cause phrase.

The computing system 102 may generate the phrase 508 by inserting the data 609, 611, and 613 into the phrase template 708 respectively at data fields 709, 711, and 713. The computing system 102 may generate the phrase 512 by inserting the data 615, 617, and 619 into the phrase template 712 respectively at data fields 715, 717, and 719. As the computing system 102 is generating the phrase 512, the computing system 102 may determine that data 615 and 617 have redundant data "visual inspection." Accordingly, the computing system 102 may remove the redundant recitation of "visual inspection" from the phrase 512. The computing system 102 may generate the phrase 514 by inserting the data 621, 623, and 625 into the phrase template 714 respectively at 721, 723, and 725. The computing system 102 may generate the phrase 516 by inserting the data 627, 629, and 631 into the phrase template 716 respectively at 727, 729, and 731.

In some instances, the computing system 102 may non-randomly select a phrase template for inclusion within the repair tip 500. For example, the computing system 102 may determine that the phrase template 708 was the least recently selected phrase template of any of the phrase templates 708-722 stored by the computing system 102. In response, the computing system 102 may select the phrase template 708 based on that determination. Any of the phrase templates 712-722 selected for use in the repair tip 500 may be selected in any of the ways described herein.

In some examples, identifying data for inclusion in a phrase template may include determining that such data corresponds to a data field of the phrase template. Accordingly, inserting such data into the phrase template may include inserting the data into the corresponding data fields of the phrase template.

For instance, the computing system 102 may store data indicating that the data fields 709, 711, and 713 correspond respectively to data fields "Tool or Technique Used," "Diagnostic Action Performed," and "Result of Diagnostic Action" of data table 600. Accordingly, the computing system 102 may determine that the data 609, 611, and 613 correspond respectfully to the data fields 709, 711, and 713 of the phrase template 708. After determining that the data 609, 611, and 613 correspond respectfully to the data fields 709, 711, and 713, the computing system 102 may insert the data 609, 611, and 613 into the data fields 709, 711, and 713, respectfully, thereby generating the phrase 708.

The computing system 102 may also store data indicating that the data fields 715, 721, and 727 correspond to the "Tool or Technique Used" data field of data table 600, the data fields 717, 723, and 729 correspond to the "Diagnostic Action Performed" data field of data table 600, and the data fields 719, 725, and 731 correspond to the "Result of Diagnostic Action" data field of data table 600. Accordingly, the computing system 102 may determine that the data 615, 617, and 619 correspond respectively to the data fields 715, 717, and 719 of the phrase template 712. The computing system 102 may also determine that the data 621, 623, and 625 correspond respectively to the data fields 721, 723, and 725 of the phrase template 714. The computing system 102 may also determine that the data 627, 629, and 631 correspond respectively to the data fields 727, 729, and 731 of the phrase template 716.

As such, the computing system 102 may enter the data 609, 611, and 613 into the data fields 709, 711, and 713, respectively, thereby generating the phase 508. The computing system 102 may also enter the data 615, 617, and 619 into the data fields 715, 717, and 719, respectively, thereby generating the phrase 512. The computing system 102 may also enter the data 621, 623, and 625 into the data fields 721, 723, and 725, respectively, thereby generating the phrase 514. The computing system 102 may also enter the data 627, 629, and 631 into the data fields 727, 729, and 731, respectively, thereby generating the phrase 516.

The title phrase 502 may similarly be generated by selecting a title phrase template from a group of title phrase templates stored by data storage device 210. An example title phrase template may be "_____, Replaced _____." Data from data fields "Diagnostic Trouble Code (DTC)" (not shown) and "Associated Component" of the data table 600 may be inserted into the title phrase template to generate the title phrase 502. The title phrase template used to generate title phrase 502 may be selected randomly from the group of title phrase templates, or the title phrase template might be selected based on determining that the title phrase template is the least recently selected title phrase template of the group. Other examples are possible.

The complaint phrase 504 may similarly be generated by selecting a complaint phrase template from a group of complaint phrase templates stored by data storage device 210. An example title phrase template may be "The customer states that the _____." Data from the data field "Symptom" of data table 600 may be inserted into the complaint phrase template to generate the complaint phrase 504. The template used to generate complaint phrase 504 may be selected randomly from the group of complaint phrase templates, or the complaint phrase template might be selected based on determining that the complaint phrase template is the least recently selected complaint phrase template of the group. Other examples are possible.

The non-condemning cause phrase 506 may be generated similarly to any of the cause phrases 508-516 discussed herein.

The correction phrase 518 may similarly be generated by selecting a correction phrase template from a group of correction phrase templates stored by data storage device 210. An example correction phrase template may be "Replaced the _____, cleared codes, and performed a road test of the vehicle. The customer's concern did not return." Data from the data field "Associated Component" of the data table 600 may be inserted into the correction phrase template to generate the correction phrase 518. The correction phrase template may be selected randomly from the group of correction phrase templates, or the correction phrase template might be selected based on determining that the correction phrase template is the least recently selected correction phrase template of the group. Other examples are possible.

The method 400 may further involve determining that neither a first procedure nor a second procedure is a visual inspection procedure. For example, the computing system 102 may determine that the procedure described by the phrase 508 is not a visual inspection procedure by examining data 609, 611, or 613 and determining that the procedure described by the phrase 508 is instead a procedure that involves a scan tool. Likewise, the computing system 102 may determine that the procedures described respectively by the phrase 514 and the phrase 516 are not visual inspection procedures by examining data 621, 623, 625, 627, 629, and/or 631 and determining that the procedures described respectively by the phrase 514 and the phrase 516 are procedures that involve a lab scope.

The method 400 may further involve, based on determining that neither a first procedure nor a second procedure is a visual inspection procedure, identifying additional data that (i) is stored by the first computing system, (ii) is associated with the symptom and the component of the first vehicle, and (iii) is associated with a visual inspection procedure.

For example, the computing system 102 may identify data 615, 617, and/or 619 of repair record group 612 that corresponds to a visual inspection procedure. As shown, the data 615, 617, and 619 are associated with the "check engine light" symptom. For example, the phrase 512 may be generated by inserting the data 615, 617, and 619 into the phrase template 712 as described above. In this way, the computing device 102 may ensure, in some examples, that the repair tip 500 includes at least one phrase describing a visual inspection procedure. In such an example, the repair tip might include the phrases 512 and 516, but no other cause phrases. In this case, the computing system 102 may be configured to generate or select repair tips that include both (i) a condemning phrase and (ii) a non-condemning phrase that describes a visual inspection procedure.

The method 400 may further involve identifying data stored by the computing system 102 that is associated with (i) the make, the model, or the year of manufacture of the additional vehicle, (ii) the symptom of the additional vehicle, and (iii) a first procedure performed on the additional vehicle, and determining that the identified data corresponds to at least a predetermined amount (e.g., a threshold amount) of repair records stored by the computing system 102.

In one example, the predetermined amount of repair records may be 1200. Referring to FIG. 6, the computing system 102 may determine that the repair record group 608 includes 1000 repair records, the repair record group 612 includes 1500 repair records, the repair record group 614 includes 1250 repair records, and the repair record group 616 includes 1500 repair records. Accordingly, in some examples, the computing system 102 may include phrases 512, 514, and 516 in the repair tip 500 but might exclude the phrase 508 from the repair tip 500. In some instances, a threshold comparison may occur before generation of the phrases such that the phrase 508 is not generated because the repair record group 608 has less than the threshold number of repair orders.

Figure 9:
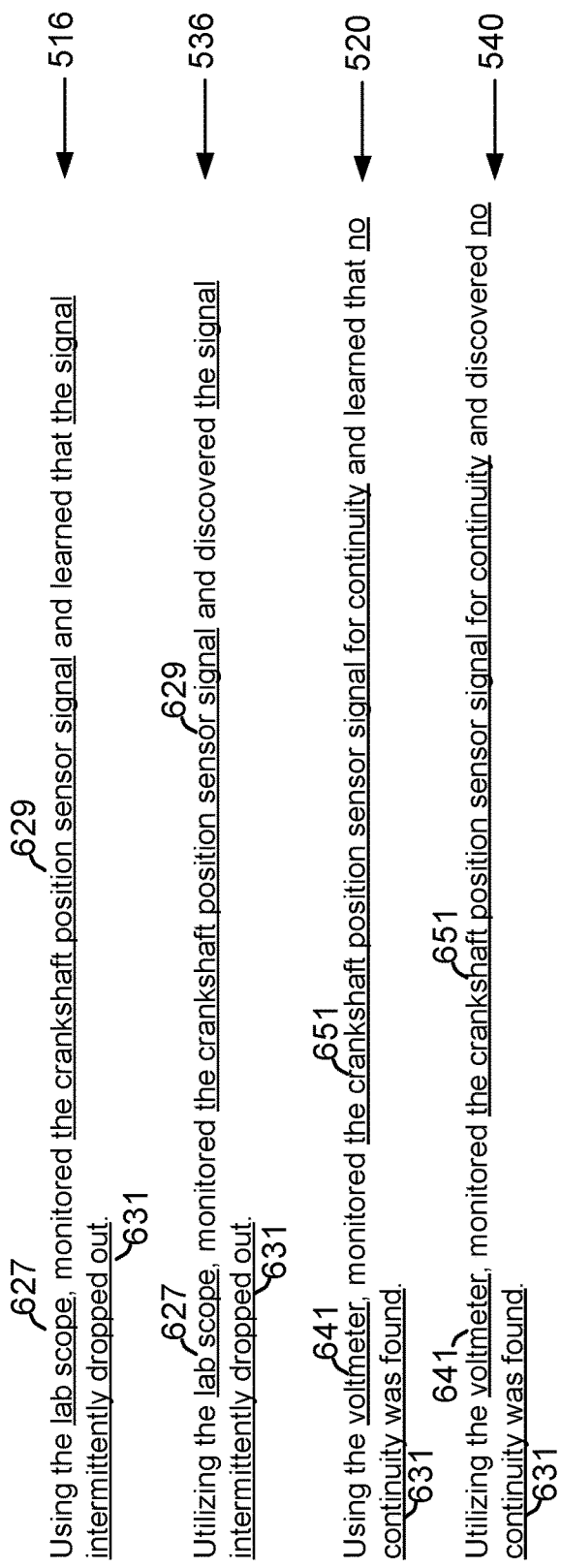
FIG. 9 shows additional example phrases.

In examples depicted in FIGS. 8 and 9, the computing system 102 may store phrases 508 and 528 that make up a first plurality of phrases, phrases 512 and 532 that make up a second plurality of phrases, phrases 514 and 534 that make up a third plurality of phrases, and phrases 516 and 536 that make up a fourth plurality of phrases. The phrases 508-516 and 528-536 may all be associated with the symptom (e.g., check engine light is on) of the first vehicle. The computing system 102 may store other phrases (not shown) that are not associated with the symptom of the first vehicle and/or are associated with other symptoms.

As shown, the phrase 508 may convey information equivalent to information conveyed by the phrase 528, yet the phrase 508 may include syntax and/or word choice that differs from the phrase 528. The phrase 512 may convey information equivalent to information conveyed by the phrase 532, yet the phrase 512 may include syntax and/or word choice that differs from the phrase 532. The phrase 514 may convey information equivalent to information conveyed by the phrase 534, yet the phrase 514 may include syntax and/or word choice that differs from the phrase 534. The phrase 516 may convey information equivalent to information conveyed by the phrase 536, yet the phrase 516 may include syntax and/or word choice that differs from the phrase 536.

Based on data table 600, the computing system 102 may associate data 609, 611, and 613 of phrases 508 and 528 with repair record group 608. Therefore, the computing system 102 may identify the phrases 508 and 528 as being associated with the first vehicle and the symptom of the first vehicle based on the content of the data fields "Make," "Model," "Year," and "Symptom," of repair record group 608. The computing system 102 may associate data 615, 617, and 619 of phrases 512 and 532 with repair record group 612. Therefore, the computing system 102 may identify the phrases 512 and 532 as being associated with the first vehicle and the symptom of the first vehicle based on the content of the data fields "Make," "Model," "Year," and "Symptom," of repair record group 612. The computing system 102 may associate data 621, 623, and 625 of phrases 514 and 534 with repair record group 614. Therefore, the computing system 102 may identify the phrases 514 and 534 as being associated with the first vehicle and the symptom of the first vehicle based on the content of the data fields "Make," "Model," "Year," and "Symptom," of repair record group 614. The computing system 102 may associate data 627, 629, and 631 of phrases 516 and 536 with repair record group 616. Therefore, the computing system 102 may identify the phrases 516 and 536 as being associated with the first vehicle and the symptom of the first vehicle based on the content of the data fields "Make," "Model," "Year," and "Symptom," of repair record group 616.

By further example, the computing system 102 may randomly or non-randomly select the phrase 508 for use in the repair tip 500 instead of the phrase 528. In other examples, the computing system 102 may select the phrase 528 instead of the phrase 508. Similarly, the computing system 102 may randomly or non-randomly select the phrase 512 for use in the repair tip 500 instead of the phrase 532. In other examples, the computing system 102 may select the phrase 532 instead of the phrase 512. Also, the computing system 102 may randomly or non-randomly select the phrase 514 for use in the repair tip 500 instead of the phrase 534. In other examples, the computing system 102 may select the phrase 534 instead of the phrase 514. Additionally, the computing system 102 may randomly or non-randomly select the phrase 516 for use in the repair tip 500 instead of the phrase 536. In other examples, the computing system 102 may select the phrase 536 instead of the phrase 516. In this context, sending the repair tip 500 to the second computing system 108 may include sending the selected phrase 508, the selected phrase 512, the selected phrase 514, and the selected phrase 516 as part of the repair tip 500.

The method 400 may further involve determining that a second procedure is not a visual inspection procedure and selecting the first phrase based on determining that the second procedure is not a visual inspection procedure. In this context, the first procedure described by the first phrase may be a procedure that includes visual inspection of the component of the second vehicle.

For example, the computing system 102 may determine that the procedure "monitored the crankshaft position sensor signal" as described by the phrase 516 is not a visual inspection procedure. In response, the computing system 102 may select the phrase 512 for inclusion in the repair tip 500 because the procedure "visual inspection" described by the phrase 512 is a visual inspection procedure.

The method 400 may further involve determining that neither a first procedure nor a second procedure is a visual inspection procedure, and based on determining that neither the first procedure nor the second procedure is a visual inspection procedure, selecting a phrase stored by the first computing system that is (i) associated with the symptom and the component of the first vehicle and (ii) describes a visual inspection procedure. In this context, sending the repair tip may include sending the phrase describing a visual inspection procedure to the second computing system.

For example, the computing system 102 may determine that neither the procedure "monitored the crankshaft position sensor signal" of phrase 516 nor the procedure "monitored the engine speed parameter" of phrase 508 is a visual inspection procedure. As a result, the computing system 102 may select the phrase 512 for inclusion in the repair tip 500 because the procedure "visual inspection" described by the phrase 512 is a visual inspection procedure. At times, describing a visual inspection procedure in the repair tip 500 may allow a repair technician to easily repair the first vehicle by performing a visual inspection.

In some examples, the computing system 102 may determine that the phrase 508 was the least recently selected phrase of the phrases 508 and 528. Similarly, the computing system 102 may determine that the phrase 512 was the least recently selected phrase of the phrases 512 and 532. Also, the computing system 102 may determine that the phrase 514 was the least recently selected phrase of the phrases 514 and 534. Additionally, the computing system 102 may determine that the phrase 516 was the least recently selected phrase of the phrases 516 and 536. Based on these determinations, the computing system 102 may include phrases 508, 512, 514, and 516 as part of the repair tip 500 that is sent to the computing system 108.

By further example, the phrases 508, 512, and/or 514 may be listed before the phrase 516 within the repair tip 500. Since the phrases 508, 512, and 514 are non-condemning phrases and the phrase 516 is a condemning phrase, a repair technician operating the computing system 108 may view the phrases 508, 512, and 514 before the phrase 516, and decide to perform the procedures described respectively by the phrases 508, 512, and 514 before performing the procedure described by the phrase 516. This may allow the repair technician to discover an "easy fix" for the symptom of the first vehicle (if possible) before performing a more complicated or burdensome procedure.

In this way, any non-condemning phrase (e.g., phrases 508, 512, and 514) selected to be included in the repair tip 500 will generally appear within the repair tip 500 before any condemning phrase selected to be included in the repair tip 500 (e.g., phrase 516). Multiple phrases selected for inclusion in the repair tip 500 may be sequenced based on one or more of (i) monetary cost of performing the respective procedures, (ii) an estimated time required to perform the respective procedures, and (iii) complexity of the respective procedures.

For example, after selecting the phrases 508, 512, and 514 for inclusion in the repair tip 500, the computing system 102 may determine a sequence of the phrases 508, 512, and 514 based one or more of the respective (i) monetary costs of performing the respective procedures described by the phrases 508, 512, and 514, (ii) the estimated respective times required to perform the respective procedures described by the phrases 508, 512, and 514, and (iii) the complexity of the respective procedures described by the phrases 508, 512, and 514. In the example depicted in FIG. 5, the phrase 508 is listed first, the phrase 512 is listed second, and the phrase 514 is listed third. This sequence may reflect the overall cost, time, and complexity of performing the respective procedures of the phrases 508, 512, and 514.

In some examples, the computing system 102 may identify the phrases 512 and 532 as being associated with the make, the model, or the year of manufacture of the first vehicle and the symptom of the first vehicle based on examining the data fields "Make," "Model," "Year," and "Symptom" of the repair record group 612. In some examples, the threshold amount of repair records may be 1200 (but other examples are possible). By examining the data table 600, the computing system 102 may determine that the phrases 512 and 532 correspond to 1500 repair records, and based on that determination the computing system 102 may include either the phrase 512 or 532 within the repair tip 500. In some examples, the phrase 508 or the phrase 528 might not be included within the repair tip 500 because the repair record group 608 corresponds to only 1000 repair records (less than 1200).

By further example, the computing system 102 may identify the phrases 516, 536, 520, and 540 as being associated with the make, the model, or the year of manufacture of the first vehicle and the symptom of the first vehicle based on examining the data fields "Make," "Model," "Year," and "Symptom" of the repair record groups 616 and 620. The computing system 102 may determine that the phrases 516 and 536 correspond to 1500 repair records, whereas the phrases 520 and 540 correspond to only 1300 repair records. Based on that determination, the computing system 102 may include either the phrase 516 or 536 within the repair tip 500 instead of the phrases 520 or 540, because 1500 is greater than 1300.

IV. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a non-transitory computer-readable medium storing program instructions, that when executed by a processor of a machine, cause the machine to perform a set of functions, the set of functions comprising the features or functions of the aspects and embodiments described herein.

We claim:

1. A method performed by a first computing system, the method comprising:
   receiving, from a second computing system, a message identifying a symptom of a first vehicle;
   identifying first stored data associated with the symptom and a component of a second vehicle that exhibited the symptom;
   identifying second stored data associated with the symptom and a component of a given vehicle;
   selecting, from a plurality of stored phrase templates, a first phrase template and a second phrase template;
   generating a first phrase describing a first procedure performed on the second vehicle, wherein generating the first phrase comprises inserting the first stored data into the first phrase template, and wherein the first procedure performed on the second vehicle yielded a result insufficient to determine that the component of the second vehicle associated with the symptom is defective; and generating a second phrase describing a second procedure performed on the given vehicle, wherein the given vehicle is either (i) the second vehicle or (ii) a third vehicle that also exhibited the symptom, wherein generating the second phrase comprises inserting the second stored data into the second phrase template, and wherein the second procedure performed on the given vehicle yielded a result sufficient to determine that a component of the given vehicle associated with the symptom is defective, and wherein the component of the given vehicle is equivalent to the component of the second vehicle;

generating a repair tip comprising the first phrase and the second phrase; and sending, to the second computing system, the repair tip including the generated first phrase and the generated second phrase.

2. The method of claim 1, further comprising:
determining that the second phrase template was a least recently selected phrase template of any of the plurality of stored phrase templates,
wherein selecting the second phrase template comprises selecting the second phrase template based on determining that the second phrase template was the least recently selected phrase template of any of the plurality of stored phrase templates.

3. The method of claim 1, wherein selecting the second phrase template comprises selecting the second phrase template randomly from the plurality of stored phrase templates.

4. The method of claim 1, further comprising:
wherein identifying the first data comprises determining that the first data corresponds to a given data field of the first phrase template, and
wherein inserting the first data into the first phrase template comprises inserting the first data into the given data field of the first phrase template.

5. The method of claim 1, wherein the first data comprises data identifying one or more of (i) the component of the second vehicle, (ii) the first procedure, (iii) the result yielded by the first procedure performed on the second vehicle, or (iv) a tool used to perform the first procedure.

6. The method of claim 1,
wherein identifying the second stored data comprises determining that the second stored data corresponds to a given data field of the second phrase template, and
wherein inserting the second stored data into the second phrase template comprises inserting the second stored data into the given data field of the second phrase template.

7. The method of claim 1,
wherein the second stored data comprises data identifying one or more of (i) the component of the given vehicle, (ii) the second procedure, (iii) the result yielded by the second procedure performed on the given vehicle, or (iv) a tool used to perform the second procedure.

8. The method of claim 1,
wherein the message identifies at least one of a make, a model, or a year of manufacture of the first vehicle,
wherein the second stored data is associated with at least one of (i) the make, the model, or the year of manufacture of the given vehicle, (ii) the symptom of the given vehicle, or (iii) the second procedure; and wherein the method further comprises:
determining that the second stored data corresponds to at least a predetermined quantity of repair records stored by a computer-readable medium.

9. The method of claim 1,
wherein the first phrase is listed before the second phrase in the repair tip,
wherein the repair tip further comprises one or more additional phrases that are listed before the second phrase in the repair tip,
wherein the one or more additional phrases describe respective procedures that were performed on respective vehicles, and
wherein the first phrase and the one or more additional phrases are listed in the repair tip in a sequence that is based on one or more of (i) monetary cost of performing the respective procedures, (ii) an estimated time required to perform the respective procedures, or (iii) complexity of the respective procedures.

10. The method of claim 1, wherein the message identifies at least one of a make, a model, or a year of manufacture of the first vehicle, the method further comprising:
identifying a second plurality of phrases stored by the first computing system that are each associated with the at least one of the make, the model, or the year of manufacture of the first vehicle and the symptom of the first vehicle, wherein the second plurality of phrases includes the second phrase; and
determining that the second phrase corresponds to at least as many repair records stored by the first computing system as any other phrase of the second plurality of phrases,
wherein sending the repair tip to the second computing system comprises sending the second phrase based on determining that the second phrase corresponds to at least as many repair records stored by the first computing system as any other phrase of the second plurality of phrases.

11. The method of claim 10, wherein the second plurality of phrases describe respective procedures performed on respective vehicles that yielded a result sufficient to determine that a component of the respective vehicle is defective.

12. A computing system comprising:
at least one processor; and
a non-transitory computer-readable medium storing instructions, that when executed by the at least one processor, cause the computing system to perform functions comprising:
receiving, from a second computing system, a message identifying a symptom of a first vehicle;
identifying first stored data associated with the symptom and a component of a second vehicle that exhibited the symptom;
identifying second stored data associated with the symptom and a component of a given vehicle;
selecting, from a plurality of stored phrase templates, a first phrase template and a second phrase template;
generating a first phrase describing a first procedure performed on the second vehicle, wherein generating the first phrase comprises inserting the first stored data into the first phrase template, and wherein the first procedure performed on the second vehicle yielded a result insufficient to determine that the component of the second vehicle associated with the symptom is defective; and
generating a second phrase describing a second procedure performed on the given vehicle, wherein the given vehicle is either (i) the second vehicle or (ii) a third vehicle that also exhibited the symptom, wherein generating the second phrase comprises inserting the second stored data into the second phrase template, and wherein the second procedure performed on the given vehicle yielded a result sufficient to determine that a component of the given vehicle associated with the symptom is defective, and wherein the component of the given vehicle is equivalent to the component of the second vehicle;

generating a repair tip comprising the first phrase and the second phrase; and sending, to the second computing system, the repair tip including the generated first phrase and the generated second phrase.

13. The computing system of claim 12, wherein the functions further comprise:

determining that the first phrase template was a least recently selected phrase template of any of the plurality of stored phrase templates, wherein selecting the first phrase template comprises selecting the first phrase template based on determining that the first phrase template was the least recently selected phrase template of any of the plurality of stored phrase templates.

14. The computing system of claim 12, wherein selecting the first phrase template comprises selecting the first phrase template randomly from the plurality of stored phrase templates.

15. The computing system of claim 12, the functions further comprising:

determining that the second phrase template was a least recently selected phrase template of any of the plurality of stored phrase templates, wherein selecting the second phrase template comprises selecting the second phrase template based on determining that the second phrase template was the least recently selected phrase template of any of the plurality of stored phrase templates.

16. The computing system of claim 12, wherein selecting the second phrase template comprises selecting the second phrase template randomly from the plurality of stored phrase templates.

17. The computing system of claim 12, wherein identifying the second stored data comprises determining that the second stored data corresponds to a given data field of the second phrase template, and wherein inserting the second stored data into the second phrase template comprises inserting the second stored data into the given data field of the second phrase template.

18. The computing system of claim 12, wherein the second stored data comprises data identifying one or more of (i) the component of the given vehicle, (ii) the second procedure, (iii) the result yielded by the second procedure performed on the given vehicle, or (iv) a tool used to perform the second procedure.

19. The computing system of claim 12, wherein the message identifies at least one of a make, a model, or a year of manufacture of the first vehicle, wherein the second stored data is associated with at least one of (i) the make, the model, or the year of manufacture of the given vehicle, (ii) the symptom of the given vehicle, or (iii) the second procedure; and wherein the functions further comprise:

determining that the second stored data corresponds to at least a predetermined quantity of repair records stored by the computer-readable medium.

20. The computing system of claim 19, wherein the first phrase is listed before the second phrase in the repair tip, wherein the repair tip further comprises one or more additional phrases that are listed before the second phrase in the repair tip, wherein the one or more additional phrases describe respective procedures that were performed on respective vehicles, and wherein the first phrase and the one or more additional phrases are listed in the repair tip in a sequence that is based on one or more of (i) monetary cost of performing the respective procedures, (ii) an estimated time required to perform the respective procedures, or (iii) complexity of the respective procedures.

21. A non-transitory computer-readable medium storing instructions that, when executed by a first computing system, cause the first computing system to perform functions comprising:

receiving, from a second computing system, a message identifying a symptom of a first vehicle;

identifying first stored data associated with the symptom and a component of a second vehicle that exhibited the symptom;

identifying second stored data associated with the symptom and a component of a given vehicle;

selecting, from a plurality of stored phrase templates, a first phrase template and a second phrase template;

generating a first phrase describing a first procedure performed on the second vehicle, wherein generating the first phrase comprises inserting the first stored data into the first phrase template, and wherein the first procedure performed on the second vehicle yielded a result insufficient to determine that the component of the second vehicle associated with the symptom is defective; and generating a second phrase describing a second procedure performed on the given vehicle, wherein the given vehicle is either (i) the second vehicle or (ii) a third vehicle that also exhibited the symptom, wherein generating the second phrase comprises inserting the second stored data into the second phrase template, and wherein the second procedure performed on the given vehicle yielded a result sufficient to determine that a component of the given vehicle associated with the symptom is defective, and wherein the component of the given vehicle is equivalent to the component of the second vehicle;

generating a repair tip comprising the first phrase and the second phrase; and sending, to the second computing system, the repair tip including the generated first phrase and the generated second phrase.

22. The non-transitory computer-readable medium of claim 12, wherein the functions further comprise:

determining that the first phrase template was a least recently selected phrase template of any of the plurality of stored phrase templates, wherein selecting the first phrase template comprises selecting the first phrase template based on determining that the first phrase template was the least recently selected phrase template of any of the plurality of stored phrase templates.

23. The non-transitory computer-readable medium of claim 12, wherein selecting the first phrase template comprises selecting the first phrase template randomly from the plurality of stored phrase templates.

24. The non-transitory computer-readable medium of claim 12, the functions further comprising:
   determining that the second phrase template was a least recently selected phrase template of any of the plurality of stored phrase templates,
   wherein selecting the second phrase template comprises selecting the second phrase template based on determining that the second phrase template was the least recently selected phrase template of any of the plurality of stored phrase templates.

25. The non-transitory computer-readable medium of claim 12, wherein selecting the second phrase template comprises selecting the second phrase template randomly from the plurality of stored phrase templates.

26. The non-transitory computer-readable medium of claim 21,
   wherein identifying the second stored data comprises determining that the second stored data corresponds to a given data field of the second phrase template, and
   wherein inserting the second stored data into the second phrase template comprises inserting the second stored data into the given data field of the second phrase template.

27. The non-transitory computer-readable medium of claim 21,
   wherein the second stored data comprises data identifying one or more of (i) the component of the given vehicle, (ii) the second procedure, (iii) the result yielded by the second procedure performed on the given vehicle, or (iv) a tool used to perform the second procedure.

28. The non-transitory computer-readable medium of claim 21,
   wherein the message identifies at least one of a make, a model, or a year of manufacture of the first vehicle,
   wherein the second stored data is associated with at least one of (i) the make, the model, or the year of manufacture of the given vehicle, (ii) the symptom of the given vehicle, or (iii) the second procedure; and
   wherein the functions further comprise:
   determining that the second stored data corresponds to at least a predetermined quantity of repair records stored by the computer-readable medium.

29. The non-transitory computer-readable medium of claim 21,
   wherein the first phrase is listed before the second phrase in the repair tip,
   wherein the repair tip further comprises one or more additional phrases that are listed before the second phrase in the repair tip,
   wherein the one or more additional phrases describe respective procedures that were performed on respective vehicles, and
   wherein the first phrase and the one or more additional phrases are listed in the repair tip in a sequence that is based on one or more of (i) monetary cost of performing the respective procedures, (ii) an estimated time required to perform the respective procedures, or (iii) complexity of the respective procedures.

\* \* \* \* \*